United States Patent
Kashyap

(10) Patent No.: US 10,462,452 B2
(45) Date of Patent: Oct. 29, 2019

(54) SYNCHRONIZING ACTIVE ILLUMINATION CAMERAS

(71) Applicant: Microsoft Technology Licensing, LLC., Redmond, WA (US)

(72) Inventor: Abhinav Kashyap, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 693 days.

(21) Appl. No.: 15/071,246

(22) Filed: Mar. 16, 2016

(65) Prior Publication Data
US 2017/0272731 A1    Sep. 21, 2017

(51) Int. Cl.
| | | |
|---|---|---|
| *H04N 13/296* | (2018.01) | |
| *H04N 13/243* | (2018.01) | |
| *H04N 13/254* | (2018.01) | |
| *H04N 5/225* | (2006.01) | |
| *H04N 5/232* | (2006.01) | |
| *G01S 17/87* | (2006.01) | |
| *G01S 17/89* | (2006.01) | |
| *G01S 7/00* | (2006.01) | |
| *G01S 7/484* | (2006.01) | |

(52) U.S. Cl.
CPC ........... *H04N 13/296* (2018.05); *G01S 7/003* (2013.01); *G01S 7/484* (2013.01); *G01S 17/87* (2013.01); *G01S 17/89* (2013.01); *H04N 5/2256* (2013.01); *H04N 5/23203* (2013.01); *H04N 13/243* (2018.05); *H04N 13/254* (2018.05)

(58) Field of Classification Search
None
See application file for complete search history.

(56) References Cited

U.S. PATENT DOCUMENTS

| | | |
|---|---|---|
| 4,288,078 A | 9/1981 | Lugo |
| 4,492,473 A | 1/1985 | Richter et al. |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |

(Continued)

FOREIGN PATENT DOCUMENTS

| | | |
|---|---|---|
| CN | 201254344 Y | 6/2009 |
| CN | 102073050 A | 5/2011 |

(Continued)

OTHER PUBLICATIONS

International Search Report and Written Opinion Issued in PCT Application No. PCT/US2017/021472, dated May 29, 2017, 11 Pages.

(Continued)

*Primary Examiner* — William C Vaughn, Jr.
*Assistant Examiner* — Daniel T Tekle

(57) ABSTRACT

Apparatus for controlling a plurality of active illumination cameras to operate in a frequency division multiplexed operating mode to acquire images of scenes that the cameras image.

20 Claims, 4 Drawing Sheets

(56) References Cited

U.S. PATENT DOCUMENTS

| | | |
|---|---|---|
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,278,923 A | 1/1994 | Nazarathy et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,323 A | 12/1996 | Suzuki et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,625,410 A | 4/1997 | Washino et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,717,512 A | 2/1998 | Chmielewski et al. |
| 5,839,000 A | 11/1998 | Davis et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,563 A | 11/2000 | Hutchinson et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,515,740 B2 | 2/2003 | Bamji et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,778,263 B2 | 8/2004 | Ortyn et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,405,812 B1 | 7/2008 | Bamji |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,542,210 B2 | 6/2009 | Chirieleison, Sr. |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |

(56) References Cited

U.S. PATENT DOCUMENTS

| | | |
|---|---|---|
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,912,252 B2 | 3/2011 | Ren et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,063,750 B2 | 11/2011 | Knibbe |
| 8,072,470 B2 | 12/2011 | Marks |
| 8,180,298 B2 | 5/2012 | Drude |
| 8,331,418 B2 | 12/2012 | Chou |
| 8,355,117 B2 | 1/2013 | Niclass |
| 8,408,706 B2 | 4/2013 | Yahav |
| 8,487,838 B2 | 7/2013 | Lewis et al. |
| 8,593,375 B2 | 11/2013 | Maltz |
| 8,602,887 B2 | 12/2013 | Tardif et al. |
| 8,723,924 B2 | 5/2014 | Mirbach et al. |
| 8,872,910 B1 | 10/2014 | Vaziri |
| 8,879,050 B2 | 11/2014 | Ko |
| 8,888,287 B2 | 11/2014 | Yahav |
| 8,941,561 B1 | 1/2015 | Starner |
| 8,988,662 B1 | 3/2015 | Haskin et al. |
| 8,998,414 B2 | 4/2015 | Bohn |
| 9,079,103 B2 | 7/2015 | Russo et al. |
| 9,442,186 B2 | 9/2016 | Payne et al. |
| 9,723,992 B2 | 8/2017 | Senechal et al. |
| 9,769,368 B1 | 9/2017 | Morford et al. |
| 2002/0083474 A1 | 6/2002 | Hennenhoefer et al. |
| 2003/0125019 A1 | 7/2003 | Bajikar |
| 2003/0151453 A1 | 8/2003 | Laletin |
| 2003/0181213 A1 | 9/2003 | Sugar et al. |
| 2004/0259589 A1 | 12/2004 | Bahl et al. |
| 2005/0024259 A1 | 2/2005 | Berry et al. |
| 2005/0195383 A1 | 9/2005 | Breed et al. |
| 2006/0024041 A1 | 2/2006 | Lou et al. |
| 2007/0104015 A1 | 5/2007 | Srinivas et al. |
| 2008/0026838 A1 | 1/2008 | Dunstan et al. |
| 2008/0057881 A1 | 3/2008 | Dwyer |
| 2008/0240048 A1 | 10/2008 | Okker et al. |
| 2009/0039734 A1 | 2/2009 | Takahashi et al. |
| 2009/0052037 A1 | 2/2009 | Wernersson |
| 2009/0163185 A1 | 6/2009 | Lim et al. |
| 2010/0110280 A1 | 5/2010 | Aoyama |
| 2010/0123770 A1 | 5/2010 | Friel et al. |
| 2010/0214214 A1 | 8/2010 | Corson et al. |
| 2010/0214419 A1 | 8/2010 | Kaheel et al. |
| 2010/0290054 A1 | 11/2010 | Cho |
| 2010/0315905 A1 | 12/2010 | Lee et al. |
| 2011/0006978 A1 | 1/2011 | Yuan |
| 2011/0037849 A1 | 2/2011 | Niclass et al. |
| 2011/0216744 A1 | 9/2011 | Taaghol et al. |
| 2011/0298898 A1 | 12/2011 | Jung et al. |
| 2012/0017153 A1 | 1/2012 | Matsuda et al. |
| 2012/0033045 A1 | 2/2012 | Schweize et al. |
| 2012/0065494 A1 | 3/2012 | Gertner et al. |
| 2012/0082346 A1 | 4/2012 | Katz et al. |
| 2012/0098964 A1 | 4/2012 | Oggier et al. |
| 2012/0098965 A1 | 4/2012 | Barcala |
| 2012/0133754 A1 | 5/2012 | Lee et al. |
| 2012/0230250 A1 | 9/2012 | Kasslin et al. |
| 2012/0313900 A1 | 12/2012 | Dahl |
| 2012/0314077 A1 | 12/2012 | Clavenna et al. |
| 2013/0063550 A1 | 3/2013 | Ritchey et al. |
| 2013/0128052 A1 | 5/2013 | Catrein et al. |
| 2013/0181119 A1 | 7/2013 | Bikumandla et al. |
| 2013/0222638 A1 | 8/2013 | Wheeler et al. |
| 2013/0242058 A1 | 9/2013 | Bae et al. |
| 2013/0258089 A1 | 10/2013 | Lyons et al. |
| 2013/0314421 A1 | 11/2013 | Kim |
| 2014/0043227 A1 | 2/2014 | Skogo et al. |
| 2014/0055771 A1 | 2/2014 | Oggier |
| 2014/0071234 A1 | 3/2014 | Millett |
| 2014/0094307 A1 | 4/2014 | Doolittle et al. |
| 2014/0104394 A1 | 4/2014 | Yanai et al. |
| 2014/0133825 A1 | 5/2014 | Kozloski et al. |
| 2014/0240464 A1 | 8/2014 | Lee |
| 2014/0240469 A1 | 8/2014 | Lee |
| 2014/0266988 A1 | 9/2014 | Fisher et al. |
| 2014/0333917 A1 | 11/2014 | Payne et al. |
| 2014/0355947 A1 | 12/2014 | Slamecka et al. |
| 2015/0002392 A1 | 1/2015 | Kempinski |
| 2015/0003370 A1 | 1/2015 | Yokomakura et al. |
| 2015/0009049 A1 | 1/2015 | Subramanya |
| 2015/0148088 A1 | 5/2015 | Ericson |
| 2015/0180581 A1* | 6/2015 | Steiner ............... H04B 10/5561 398/188 |
| 2015/0201023 A1 | 7/2015 | Kotab |
| 2015/0346814 A1 | 12/2015 | Thukral et al. |
| 2015/0358584 A1 | 12/2015 | Mattson |
| 2016/0026253 A1 | 1/2016 | Bradski et al. |
| 2016/0275641 A1 | 9/2016 | Bostick et al. |

FOREIGN PATENT DOCUMENTS

| | | |
|---|---|---|
| DE | 102006050303 A1 | 6/2007 |
| DE | 102011089636 A1 | 6/2012 |
| EP | 0583061 A2 | 2/1994 |
| EP | 1647839 A2 | 4/2006 |
| JP | 8044490 A | 2/1996 |
| WO | 9310708 A1 | 6/1993 |
| WO | 9717598 A1 | 5/1997 |
| WO | 9944698 A2 | 9/1999 |
| WO | 2007097738 A2 | 8/2007 |
| WO | 2011084799 A1 | 7/2011 |
| WO | 2013026678 A1 | 2/2013 |
| WO | 2013066334 A1 | 5/2013 |
| WO | 2013127973 A1 | 9/2013 |
| WO | 2014072100 A1 | 5/2014 |
| WO | 2014180553 A1 | 11/2014 |
| WO | 2015006475 A1 | 1/2015 |
| WO | 2015066475 A1 | 5/2015 |
| WO | 2015107529 A1 | 7/2015 |

OTHER PUBLICATIONS

Kim, et al., "Multi-view Image and ToF Sensor Fusion for Dense 3D Reconstruction", In Proceedings of IEEE 12th International Conference on Computer Vision Workshops, Sep. 27, 2009, 8 pages.
Payne, et al., "Multiple Frequency Range Imaging to Remove Measurement Ambiguity", In Proceedings of at 9th Conference on Optical 3-D Measurement Techniques, Jul. 1, 2009, pp. 139-148.
Holmlund, Jonas, "Characterization and Compensation of Stray Light Effects in Time of Flight based Range Sensors", In Master's Thesis in Engineering Physics, May 2013, 86 pages.
U.S. Appl. No. 14/870,013, filed Sep. 30, 2015.
U.S. Appl. No. 14/979,602, filed Dec. 28, 2015.
"Non Final Office Action Issued in U.S. Appl. No. 14/979,602", dated Mar. 29, 2019, 23 Pages.
Mure-Dubois, et al., "Fusion of Time of Flight Camera Point Clouds", In Workshop on Multi-Camera and Multi-Modal Sensor Fusion Algorithms and Applications, Oct. 1, 2008, pp. 1-12.
Pavlovic, et al., "Visual Interpretation of Hand Gestures for Human-Computer Interaction: A Review", In Proceedings of IEEE Transactions on Pattern Analysis and Machine Intelligence, vol. 19, Issue 7, Jul. 1997, pp. 677-695.
"International Preliminary Report on Patentability Issued in PCT Application No. PCT/US2014/037753", dated Jun. 30, 2015, 7 Pages.
"International Search Report & Written Opinion for PCT Patent Application No. PCT/US2014/037753", dated Sep. 10, 2014, 12 Pages.

(56) References Cited

OTHER PUBLICATIONS

"Second Written Opinion Issued in PCT Application No. PCT/US2014/037753", dated Mar. 20, 2015, 5 Pages.
"International Preliminary Report on Patentability Issued in PCT Application No. PCT/US2016/043801", dated Jul. 17, 2017, 6 Pages.
"International Search Report and Written Opinion Issued in PCT Application No. PCT/US2016/043801", dated Oct. 19, 2016, 11 Pages.
"International Preliminary Report on Patentability Issued in PCT Application No. PCT/US2016/048920", dated Dec. 19, 2017, 8 Pages.
"International Search Report and Written Opinion Issued in PCT Application No. PCT/US2016/048920", dated Nov. 30, 2016, 12 Pages.
"Second Written Opinion Issued in PCT Application No. PCT/US2016/048920", dated Aug. 31, 2017, 8 Pages.
Qian, et al., "A Gesture-Driven Multimodal Interactive Dance System", In Proceedings of the IEEE International Conference on Multimedia and Expo, vol. 3, Jun. 27, 2004, 4 Pages.
Rosenhahn, et al., "Automatic Human Model Generation", In Proceedings of International Conference on Computer Analysis of Images and Patterns, Sep. 5, 2005, pp. 41-48.
Shao, et al., "An Open System Architecture for a Multimedia and Multimodal User Interface", Retrieved From: http://www.dinf.ne.jp/doc/english/Us_Eu/conf/tide98/84/shao_schroter_html, Aug. 24, 1998, 8 Pages.
Sheridan, et al., "Virtual Reality Check", In Journal of Technology Review, vol. 96, Issue 7, Oct. 1993, 9 Pages.
Stevens, Jane E., "Flights into Virtual Reality Treating Real World Disorders", In The Washington Post on Science Psychology, Mar. 27, 1995, 2 Pages.
Wren, et al., "Pfinder: Real-Time Tracking of the Human Body", In Proceedings of IEEE Transactions on Pattern Analysis and Machine Intelligence, vol. 19, Issue 7, Jul. 1997, pp. 780-785.
Wu, Martin K., "Interference Problems of Fluorescent Lamps Operating on High Frequency Electronic Ballasts With Infrared Remote Control Equipment and Infrared Simultaneous Interpretation System", In Proceedings of Electrical and Mechanical Services Department, Energy Efficient Office, Aug. 2003, pp. 1-8.
Zhao, Liang, "Dressed Human Modeling, Detection, and Parts Localization", Submitted in partial fulfillment of the requirements for the degree of Doctor of Philosophy, The Robotics Institute, Carnegie Mellon University, Jul. 26, 2001, 121 Pages.
"Design Principles for Voice Over WLAN", Retrieved From: https://web.archive.org/web/20140227160101/http://www.cisco.com/c/en/us/solutions/collateral/wireless/4400-series-wireless-lan-controllers/net_implementation_white_paper0900aecd804f1a46.html, Retrieved on: Feb. 27, 2014, 16 Pages.
"About the Motion Capture Module", Retrieved From: http://download.autodesk.com/us/maya/MayaMatchMoverOnlineHelp/index.html?url=WS73099cc142f48755-385a98b012180d20f19-5e06.htm, topicNumber=d0e17487, Retrieved on: Oct. 16, 2015, 2 Pages.
"Circuit Description of the IR Receiver Modules", Retrieved From: https://www.vishay.com/docs/80069/circuit.pdf, Feb. 27, 2013, pp. 1-2.
"Infrared Receivers for 3D Active Glasses", Retrieved From: https://web.archive.org/web/20120612205024/http://www.vishay.com/docs/49150/vmn-sg21.pdf, Retrieved on: Jun. 12, 2012, 4 Pages.
"Simulation and Training", In Division Incorporated, Jan. 1994, 6 Pages.
"SwissRanger SR-3000 Manual", Retrieved From: https://aiweb.techfak.uni-bielefeld.de/files/SR3000_manual_V1.03.pdf, Oct. 2006, pp. 1-28.
"Virtual High Anxiety", In Tech Update, Aug. 1995, 1 Page.
"Final Office Action Issued in U.S. Appl. No. 14/055,660", dated May 5, 2015, 29 Pages.
"Non Final Office Action Issued in U.S. Appl. No. 14/055,660", dated Feb. 13, 2015, 19 Pages.
"Non Final Office Action Issued in U.S. Appl. No. 14/055,660", dated Sep. 30, 2015, 32 Pages.
"Application Filed in U.S. Appl. No. 14/542,455", filed Nov. 14, 2014, 29 Pages.
"Non Final Office Action Issued in U.S. Appl. No. 14/836,490", dated Oct. 3, 2017, 22 Pages.
"Final Office Action Issued in U.S. Appl. No. 14/870,013", dated Jul. 3, 2018, 10 Pages.
"Non Final Office Action Issued in U.S. Appl. No. 14/870,013", dated Oct. 24, 2017, 9 Pages.
"Final Office Action Issued in U.S. Appl. No. 14/979,602", dated Feb. 2, 2018, 27 Pages.
"Non Final Office Action Issued in U.S. Appl. No. 14/979,602", dated Jul. 19, 2018, 28 Pages.
"Final Office Action Issued in U.S. Appl. No. 14/979,602", dated Nov. 28, 2018, 29 Pages.
"Non Final Office Action Issued in U.S. Appl. No. 14/979,602", dated Sep. 7, 2017, 21 Pages.
"Office Action Issued in European Patent Application No. 14734582.1", dated Feb. 2, 2018, 10 Pages.
"First Office Action and Search Report Issued in Chinese Patent Application No. 201480028101.8", dated Nov. 28, 2016, 13 Pages.
"Notice of Allowance Issued in Chinese Patent Application No. 201480028101.8", dated Aug. 17, 2017, 6 Pages.
Aggarwal, et al., "Human Motion Analysis: A Review", In Proceedings of IEEE Nonrigid and Articulated Motion Workshop, Jun. 16, 1997, 13 Pages.
Azarbayejani, et al., "Visually Controlled Graphics", In Proceedings of the IEEE Transactions on Pattern Analysis and Machine Intelligence, vol. 15, Issue 6, Jun. 1993, pp. 602-605.
Basso, et al., "Online Calibration for Networks of Cameras and Depth Sensors", In Proceedings of 12th Workshop on Non-classical Cameras, Camera Networks and Omnidirectional Vision, Jun. 5, 2014, 6 Pages.
Breen, et al., "Interactive Occlusion and Collision of Real and Virtual Objects in Augmented Reality", In Technical Report ECRC-95-02, European Computer Industry Research Center, Jan. 1995, 22 Pages.
Brogan, et al., "Dynamically Simulated Characters in Virtual Environments", In Proceedings of IEEE Computer Graphics and Applications, vol. 18, Issue 5, Sep. 18, 1998, pp. 58-69.
Chennamma, et al., "A Survey on Eye-Gaze Tracking Techniques", In Proceedings of Indian Journal of Computer Science and Engineering, vol. 4, Issue 5., Oct. 2013, pp. 388-393.
Dietz, et al., "Infrared Reflectography Using 3D Laser Scanning", In Magazine of e-Conservation, Issue 18, Mar. 13, 2011, 12 Pages.
"Bell TV Update for 9242 HD PVR Fixes IR Interference Bug", Retrieved From: https://www.digitalhome.ca/2010/02/bell-tv-update-for-9242-hd-pvr-fixes-ir-interference-bug/, Feb. 5, 2010, 2 Pages.
Fisher, et al., "Virtual Environment Display System", In Proceedings of the ACM Workshop on Interactive 3D graphics, Oct. 23, 1986, 12 Pages.
Freeman, et al., "Television Control by Hand Gestures", In Proceedings of the International Workshop on Automatic Face and Gesture Recognition, Jun. 26, 1995, 5 Pages.
Gokturk, et al., "A Time-Of-Flight Depth Sensor—System Description, Issues and Solutions", In Proceedings of Conference on Computer Vision and Pattern Recognition Workshop, Jun. 27, 2004, 9 pages.
Granieri, et al., "Simulating Humans in VR", In Virtual Reality and its Applications, Academic Press, Jan. 1995, 15 Pages.
Graupner, et al., "Evaluating Requirements for Gaze-Based Interaction in a See-Through Head Mounted Display", In the Proceedings of the Symposium on Eye Tracking Research & Applications, Mar. 26, 2008, pp. 91-94.
Hansard, et al., "Time of Flight Cameras: Principles, Methods and Applications", Retrieved From: https://hal.inria.fr/nal-00725654/PDF/TOF.pdf, Dec. 7, 2012, 103 Pages.
Hasegawa, et al., "Human-Scale Haptic Interaction With a Reactive Virtual Human in a Real-Time Physics Simulator", In Magazine of Computers in Entertainment, vol. 4, Issue 3, Jul. 2006, pp. 1-12.

(56) References Cited

OTHER PUBLICATIONS

He, Lei, "Generation of Human Body Models", A thesis submitted in partial fulfillment of the requirements for the degree of Master of Science in Computer Science, The University of Auckland, Apr. 2005, 111 Pages.

Hongo, et al., "Focus of Attention for Face and Hand Gesture Recognition Using Multiple Cameras", In Proceedings of the Fourth IEEE International Conference on Automatic Face and Gesture Recognition, Mar. 28, 2000, 6 Pages.

Isard, et al., "Condensation—Conditional Density Propagation for Visual Tracking", In Proceedings of the International Journal of Computer Vision, vol. 29, Issue 1, Aug. 1998, 24 Pages.

Jamalabdollahi, et al., "Energy Efficient Ranging in Wireless Sensor Networks Via a New Time Slot-based Round-Trip Algorithm", In Proceedings of IEEE Aerospace Conference, Mar. 1, 2014, pp. 1-7.

Kanade, et al., "A Stereo Machine for Video-Rate Dense Depth Mapping and Its New Applications", In Proceedings of IEEE Computer Society Conference on Computer Vision and Pattern Recognition, Jun. 18, 1996, pp. 196-202.

Kohler, Markus, "Special Topics of Gesture Recognition Applied in Intelligent Home Environments", In Proceedings of the International Gesture Workshop, Sep. 17, 1997, 12 Pages.

Kohler, Markus, "Technical Details and Ergonomical Aspects of Gesture Recognition Applied in Intelligent Home Environments", Retrieved From: https://pdfs.semanticscholar.org/0210/daa859d8574b1e1f98f809814e83022c75e4.pdf, Jan. 1997, 35 Pages.

Kohler, Markus, "Vision Based Remote Control in Intelligent Home Environments", In Journal of 3D Image Analysis and Synthesis, vol. 96, Nov. 1996, 8 Pages.

Kozma, et al., "GaZIR: Gaze-Based Zooming Interface for Image Retrieval", In Proceedings of the International Conference on Multimodal Interfaces, Nov. 2, 2009, 8 Pages.

Litos, et al., "Synchronous Image Acquisition Based on Network Synchronization", In Proceedings of the Conference on Computer Vision and Pattern Recognition Workshop, Jun. 17, 2006, 6 Pages.

Livingston, Mark Alan, "Vision-Based Tracking With Dynamic Structured Light for Video See-through Augmented Reality", A Dissertation submitted to the faculty of The University of North Carolina Chapel Hill in partial fulfillment of the requirements for the degree of Doctor of Philosophy in the Department of Computer Science, Chapel Hill, Jan. 1998, 145 Pages.

Lussier, et al., "Automatic Calibration of RGBD and Thermal Cameras", In Proceedings of IEEE International Conference on Intelligent Robots and Systems, Sep. 14, 2014, pp. 451-458.

Mistele, et al., "Choosing an Infrared Receiver Based on AGC Type", Retrieved from: https://www.vishay.com/docs/49860/0811wd_d.pdf, Nov. 2008, 2 pages.

Miyagawa, et al., "CCD-Based Range Finding Sensor", In Proceedings of IEEE Transactions on Electron Devices, vol. 44, Issue 10, Oct. 1997, pp. 1648-1652.

Moreira, et al., "Performance of Infrared Transmission Systems Under Ambient Light Interference", In Proceedings of IEEE Optoelectronics, vol. 143, Issue 6, Dec. 1996, pp. 339-346.

\* cited by examiner

SYNCHRONIZING ACTIVE ILLUMINATION CAMERAS

BACKGROUND

A three dimensional (3D) range camera determines distances to features in a scene that it images and may provide the distances in a range image, also referred to as a 3D image. The range image, or 3D image, may comprise three spatial coordinates for each of a plurality of features in the scene relative to an origin of coordinates located at the camera. Active illumination range cameras provide range images of scenes that they image based at least in part on light reflected by features in the scenes from light that the cameras transmit to illuminate the scenes. A time of flight (TOF) active illumination range camera transmits modulated light to illuminate a scene that it images and modulates sensitivity of the range camera to register light reflected by features in the scene from the transmitted light. An amount of light that the TOF range camera registers from a given feature in the scene is proportional to a cross correlation of light reflected by the feature from the transmitted light that reaches the camera and the time modulated camera exposure periods during which the camera registers light. The TOF range camera determines a round trip time for light to travel from the camera to the feature and back to the camera based on the amount of reflected light that the camera registers for the feature and uses the round trip time and the speed of light to determine distance to the feature.

Whereas active illumination range cameras were originally relatively scarce and limited to technical, engineering, and scientific applications, active illumination range imaging technology has matured, and range cameras are frequent components of a continually expanding catalog of consumer products. Range cameras may be found not only in video game consoles, but laptop computers, workbooks, tablets, smartphones, and even wrist watches.

SUMMARY

With the increase in the commercial popularity of range cameras, it is anticipated that various venues may periodically become crowded with many users attempting to simultaneously operate active illumination range cameras to range image scenes in, or from, the venue. And it is expected that when a venue becomes crowded with users operating active illumination range cameras, light transmitted by an active illumination range camera in the venue may interfere with operation of another of the active illumination range cameras operating in the venue. A venue in which active illumination cameras might interfere with each other's operation may be referred to as an "imaging neighborhood".

An aspect of an embodiment of the disclosure therefore relates to providing a system, optionally referred to as a "FRE-CAM-Sync system", or "FRE-CAM-Sync", configured to coordinate active illumination TOF range cameras operating in a same venue to operate in a frequency division multiplexing (FDM) imaging mode that contributes to moderating interference between operation of the TOF range cameras. In the FDM mode each TOF range camera in the venue, hereinafter also referred to as an imaging neighborhood, operates at a different imaging frequency, which may also be referred to as an "FDM imaging frequency" or "FDM frequency" when range imaging a scene. When operating at a given FDM imaging frequency, the TOF camera modulates light that it transmits to illuminate the scene and modulates exposure periods of the camera with modulation functions having a period determined by the given FDM imaging frequency.

In an embodiment, TOF cameras in a same imaging neighborhood and the FRE-CAM-Sync may cooperate to establish a wireless local area network (WLAN) in the imaging neighborhood over which the cameras may communicate to implement a FDM imaging mode. In an embodiment the FRE-CAM-Sync system transmits to each of a plurality of TOF cameras operating in a same imaging neighborhood an FDM configuration signal that provides the camera with an exclusive FDM imaging frequency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1A:
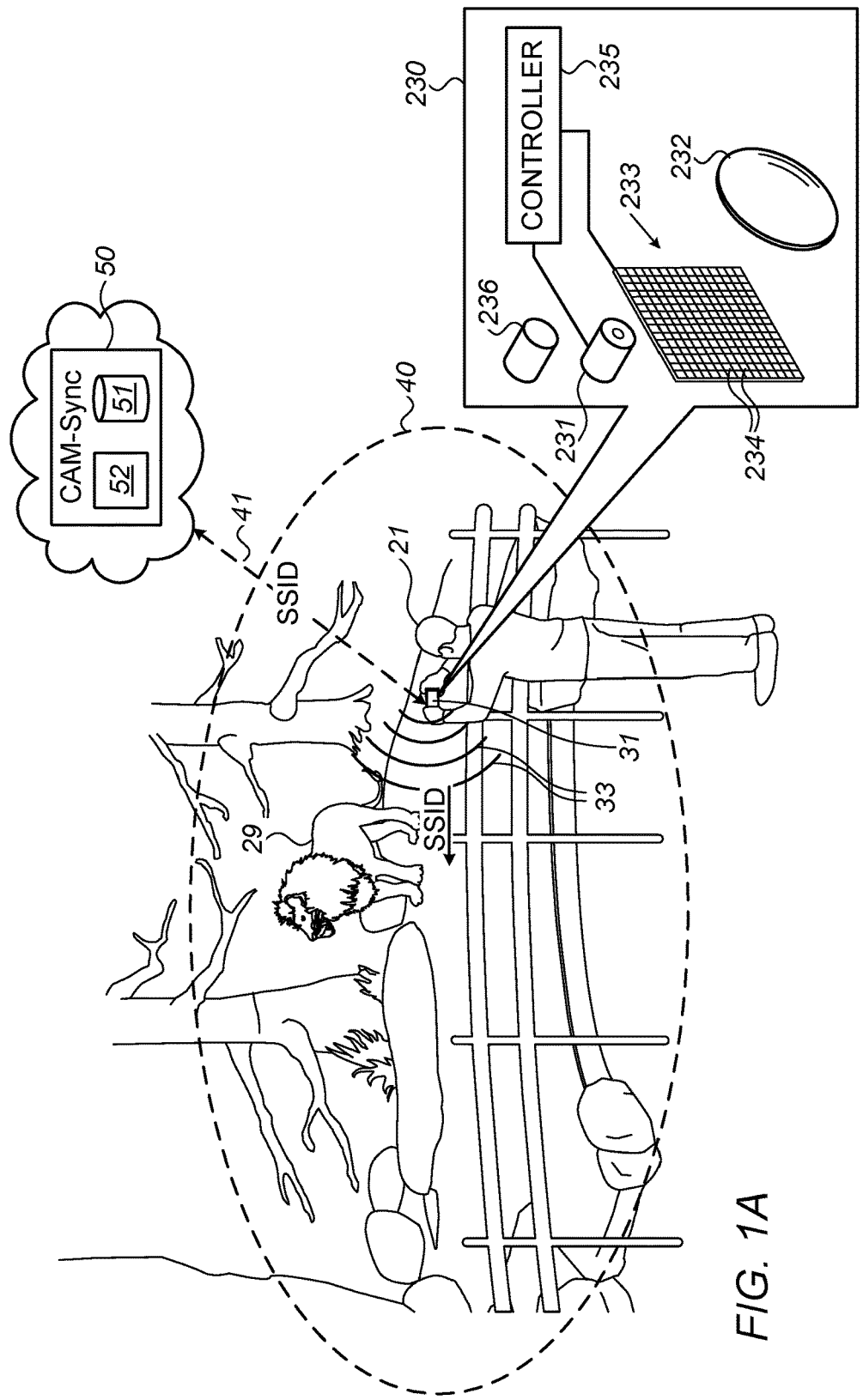
FIG. 1A schematically shows, an active illumination TOF range camera subscribed to a FRE-CAM-Sync system and present in an imaging neighborhood, communicating with the FRE-CAM-Sync system, in accordance with an embodiment of the disclosure.

In the detailed description below, aspects of a FRE-CAM-Sync system comprising an, optionally cloud-based, hub that facilitates establishment of a WLAN over which active illumination TOF range cameras communicate to operate in a FDM imaging mode in accordance with an embodiment of the disclosure, are discussed with reference to FIGS. 1A, 1B and 1C. By way of example, the TOF cameras are shown present in an imaging neighborhood that is a neighborhood of a lion enclave at a zoo. FIG. 2 schematically shows a FRE-CAM-Sync in accordance with an embodiment of the disclosure operating to control a plurality of range cameras at the zoo to operate in a FDM operating mode.

The active illumination TOF range cameras shown in the figures are assumed by way of example to be gated time of flight (GT-TOF) range cameras. A GT-TOF range camera, optionally referred to as a GT-TOF camera, generates and transmits temporally modulated light in a form of a train of light pulses to illuminate a scene that it range images. Following transmission of each light pulse in the train of light pulses, the GT-TOF camera may gate ON for a short exposure period to register amounts of light from the light pulse that features in the scene reflect back to the camera. An amount of reflected light that the GT-TOF camera registers for a given feature in the scene during the short exposure periods following the transmitted light pulses is a function of a cross correlation of the reflected light pulses and the exposure periods. The GT-TOF camera uses the amount of registered light to determine a round trip time for light to travel from the GT-TOF camera to the given feature in the scene and back to the GT-TOF camera. The GT-TOF camera uses the round trip time and the speed of light to determine a distance from the GT-TOF camera to the given feature in the scene.

The GT-TOF cameras in the figures may be independent stand-alone devices or cameras comprised in any of various mobile devices, hereinafter also referred to as "mobile communication devices", configured for communication over a wireless communication network. Mobile communication devices include by way of example, laptop computers, workbooks, tablets, smartphones, cameras, wrist watches, glasses and other wearable devices configured for wireless communication. By way of example, the GT-TOF cameras in the figures are assumed to be included in smartphones.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins FIG. 1A schematically shows a visitor 21 at a zoo who has just activated a GT-TOF camera 31, optionally comprised in a smartphone, to image a lion 29 at the zoo. GT-TOF camera 31 is subscribed to an, optionally cloud based, FRE-CAM-Sync system 50 configured to communicate with subscriber GT-TOF cameras via a mobile communication network and/or the internet, in accordance with an embodiment of the disclosure. FRE-CAM-Sync 50 optionally comprises a database 51 having a list of GT-TOF cameras subscribed to FRE-CAM-Sync, and a server 52 that processes communications between FRE-CAM-Sync 50 and subscriber GT-TOF cameras, such as GT-TOF camera 31, subscribed to FRE-CAM-Sync. GT-TOF camera 31 is configured by an app, a FRE-CAM-Sync app, optionally downloaded from FRE-CAM-Sync 50 to communicate with FRE-CAM-Sync 50 and/or other GT-TOF cameras subscribed to FRE-CAM-Sync 50, to exchange data, and optionally to receive control messages that control operation of the GT-TOF camera in a FDM imaging mode.

GT-TOF camera 31 optionally comprises components that are shown greatly enlarged in an inset 230. It is to be understood that discussion of the components and their operation with respect to GT-TOF camera 31 may apply similarly to other GT-TOF cameras schematically shown in FIGS. 1B, 1C and 2. GT-TOF camera 31 comprises an, optionally IR, light source 231, a lens system represented by a lens 232, and a photosensor 233 comprising pixels 234 on which lens 232 images light received by the GT-TOF camera. A GT-TOF controller 235 in GT-TOF camera 31, controls transmission of light pulse trains by the camera's IR light source 231 and gating ON the camera's photosensor 233 for exposure periods to image and acquire distances to features of a scene, such as lion 29, that the GT-TOF camera range images.

GT-TOF camera 31 may have a communication interface 236 comprising any of various wireless communication interfaces to enable the camera to access a mobile communication network and/or the internet and communicate with FRE-CAM-Sync 50, and/or to communicate in accordance with a wireless communication protocol directly on a peer to peer basis with other GT-TOF cameras subscribed to FRE-CAM-Sync 50. By way of example, communication interface 236 may comprise at least one of, or any combination of more than one of, a WiFi, a WiFi direct, and/or a blue tooth radio interface to facilitate wireless connection to the internet and FRE-CAM-Sync 50, and to facilitate direct peer to peer wireless communication with other GT-TOF cameras subscribed to FRE-CAM-Sync 50. GT-TOF camera 31 may also be configured to communicate with other subscriber GT-TOF cameras using acoustic signaling.

An embodiment of controller 235 of GT-TOF camera 31 may comprise any electronic and/or optical processing and/or control circuitry, to provide and enable functionalities that the camera may require to support range imaging and/or communication with FRE-CAM-Sync 50 and other subscriber GT-TOF cameras. By way of example, GT-TOF camera 31 may comprise any one, or any combination of more than one of, a microprocessor, an application specific circuit (ASIC), field programmable array (FPGA) and/or system on a chip (SOC). The GT-TOF camera may comprise a memory having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). Assuming as noted above that GT-TOF camera 31 is comprised in a smartphone, imaging and communication functionalities of GT-TOF camera 31 may be supported by processor and memory circuitry comprised in the smartphone that support smartphone functionalities.

Subsequent to being turned on to acquire a range image, GT-TOF camera 31 may be configured to transmit a "sign-in" message to FRE-CAM-Sync 50 advising that it has been turned on, provide FRE-CAM-Sync 50 with an ID of the GT-TOF camera, and transmit data to FRE-CAM-Sync 50 defining the camera's geolocation. In an embodiment, the ID code transmitted by a GT-TOF camera 31 is an international mobile subscriber identity (IMSI) code of the subscriber identity module (SIM) in the smartphone that comprises the GT-TOF camera. Optionally, after receipt of the ID code, FRE-CAM-Sync 50 authenticates the ID code to determine that GT-TOF camera 31 is indeed a GT-TOF camera subscribed to FRE-CAM-Sync 50. If authenticated, FRE-CAM-Sync 50 transmits a sign-in acknowledgement message to GT-TOF camera 31 confirming sign-in. In an embodiment, GT-TOF camera 31 is also configured to initiate, after turn-on and receiving a sign-in acknowledgment message from FRE-CAM-Sync 50, a radio scan to detect radio broadcasts that indicate that there are other subscriber GT-TOF cameras in an imaging neighborhood of GT-TOF camera 31 that might interfere with operation of GT-TOF camera 31. In FIG. 1A, an imaging neighborhood of GT-TOF camera 31 is schematically indicated by a dashed ellipse 40, and GT-TOF camera 31 is an only GT-TOF camera subscribed to FRE-CAM-Sync 50 in the imaging neighborhood. As a result, GT-TOF camera 31 fails to detect any broadcasts that might indicate presence of another subscriber GT-TOF camera in imaging neighborhood 40.

In an embodiment, failing to detect radio broadcasts indicating presence of another subscriber GT-TOF camera in imaging neighborhood 40, GT-TOF camera 31 communicates with FRE-CAM-Sync 50 to request that FRE-CAM-Sync 50 optionally provide GT-TOF camera 31 with a service set identifier (SSID) for establishing a WLAN and an associated access code that other subscriber GT-TOF cameras may present to GT-TOF camera 31 to be granted access to the WLAN. Having authenticated identity of GT-TOF camera 31 as noted above, FRE-CAM-Sync 50 may transmit a message to GT-TOF camera 31 providing the GT-TOF camera with an SSID and an associated access code. A double arrowhead dashed line 41 schematically represents communication between GT-TOF camera 31 and FRE-CAM-Sync 50. Line 41 is labeled with information (SSID) that may be communicated between the GT-TOF camera and FRE-CAM-Sync 50.

Subsequent to receiving the SSID and associated access code, GT-TOF camera 31 broadcasts a beacon comprising the SSID to disclose presence of GT-TOF camera 31 and availability of a WLAN identified by the SSID in imaging neighborhood 40. Cascaded arcs 33 schematically represent the beacon transmitted by GT-TOF camera 31. Optionally, in the message that FRE-CAM-Sync 50 transmits to GT-TOF camera 31 to provide the camera with the SSID and access code, FRE-CAM-Sync 50 provides GT-TOF camera 31 with a transmission signal strength at which to transmit beacon 33. In an embodiment, FRE-CAM-Sync 50 determines the transmission signal strength to limit a broadcast range for which beacon 33 may effectively be detected and recognized by other subscriber GT-TOF cameras. The transmission signal strength and resulting broadcast range of the beacon may be determined to define an extent of imaging neighborhood 40. Optionally, in the acknowledgment message transmitted to GT-TOF camera 31 FRE-CAM-Sync 50 provides GT-TOF camera 31 with a radiant power level at which to transmit light pulses that the GT-TOF camera transmits to illuminate lion 29 and acquire a range image of the lion. In an embodiment FRE-CAM-Sync 50 determines the broadcast range of beacon 33 based on the radiant power level at which GT-TOF camera 31 operates so that beyond the beacon broadcast range, light pulses transmitted by GT-TOF camera 31 do not substantially interfere with operation of other, similar GT-TOF cameras. As long as no other subscriber GT-TOF camera operates within imaging neighborhood 40, GT-TOF camera 31 may image lion 29 without FDM imaging frequency constraints.

Figure 1B:
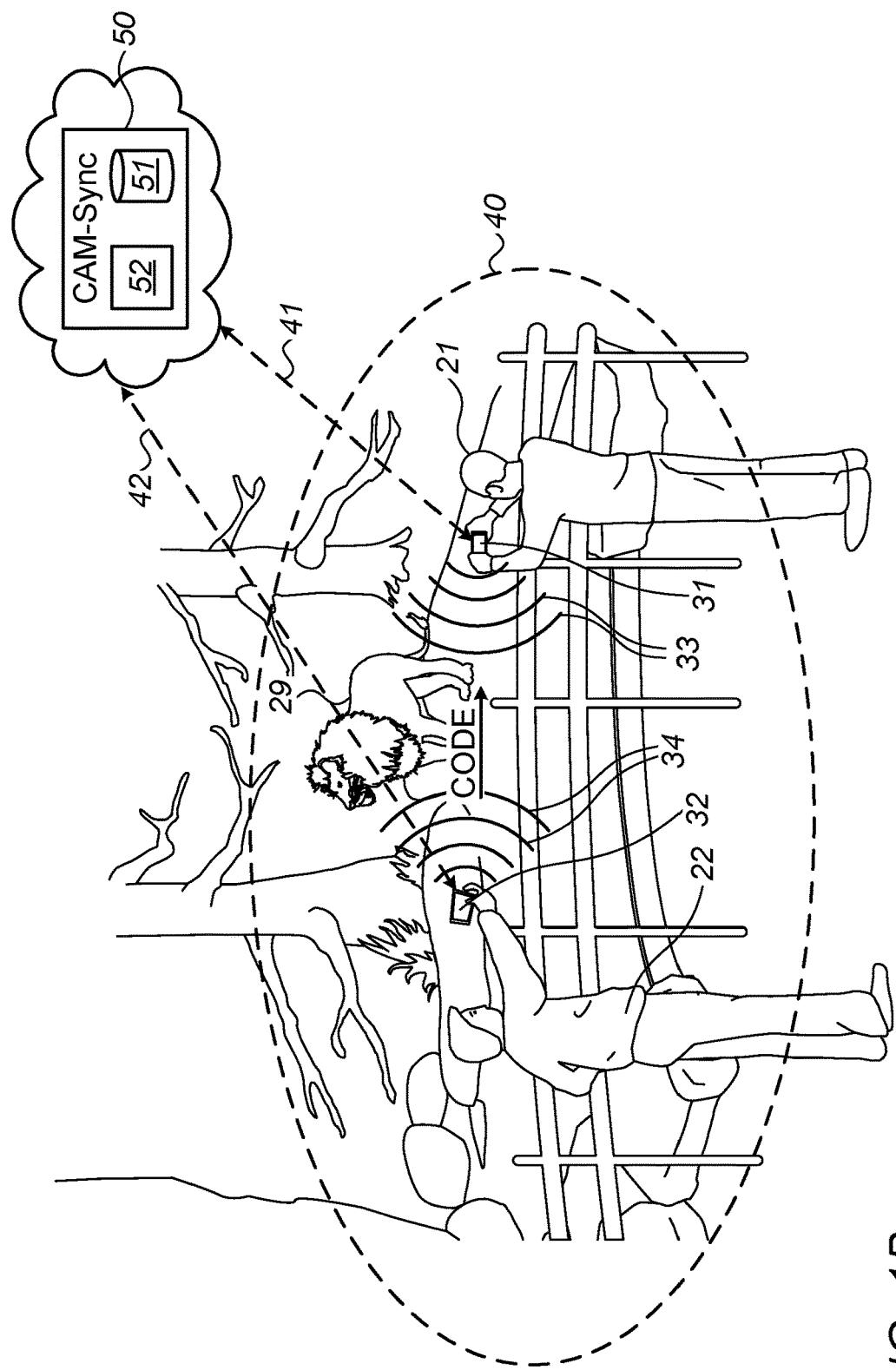
FIG. 1B schematically shows the TOF range camera shown in FIG. 1A interacting with another TOF range camera subscribed to the FRE-CAM-Sync and present in the imaging neighborhood to establish a WLAN and operate in a FDM imaging mode, in accordance with an embodiment of the disclosure.
Figure 2:
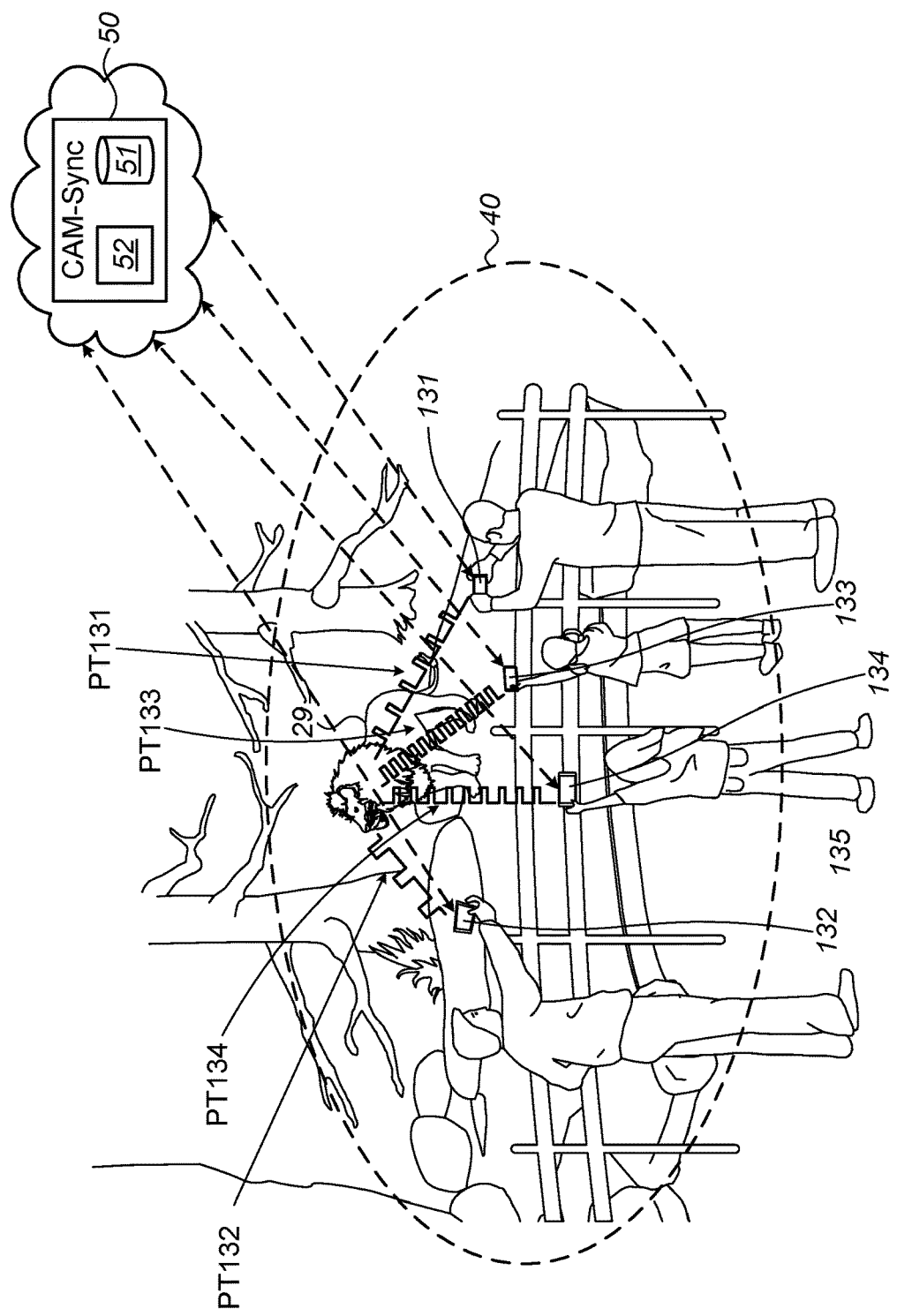
FIG. 2 schematically shows a FRE-CAM-Sync controlling active illumination range cameras in a same imaging neighborhood to operate in a FDM imaging mode, in accordance with an embodiment of the disclosure

FIG. 1B schematically shows imaging neighborhood 40 after a visitor 22 to the zoo has brought a second GT-TOF camera 32 subscribed to FRE-CAM-Sync 50 to imaging neighborhood 40 and turned on the camera to range image lion 29. After being turned on in imaging neighborhood 40, GT-TOF camera 32 may transmit the same type of data to FRE-CAM-Sync 50 that GT-TOF camera 31 transmitted to FRE-CAM-Sync when GT-TOF camera 31 was turned on. Upon receiving the data transmitted by GT-TOF camera 32 FRE-CAM-Sync 50 may transmit an acknowledgement message to GT-TOF camera 32 comprising a threshold reception signal strength for detecting a beacon transmitted by another subscriber GT-TOF camera, such as GT-TOF camera 31. In an embodiment, having been notified of the presence of GT-TOF camera 32 in imaging neighborhood at the lion enclave, and assigning GT-TOF camera 31 a transmission signal strength for transmitting beacon 33, FRE-CAM-Sync 50 sets the reception signal strength assigned to GT-TOF camera 32 based at least in part on the transmission signal strength of beacon 33 to determine an extent of imaging neighborhood 40.

Subsequent to receiving the acknowledgement message from FRE-CAM-Sync 50, GT-TOF camera 32 initiates scanning for radio transmissions from other subscriber GT-TOF cameras. However, unlike the scan performed by GT-TOF camera 31 discussed above, the radio scan performed by GT-TOF camera 32 results in GT-TOF camera 32 detecting a beacon transmitted by another subscriber GT-TOF camera in neighborhood 40—namely beacon 33 transmitted by GT-TOF camera 31. After detecting beacon 33 transmitted by GT-TOF camera 31, GT-TOF camera 32 may process the beacon to determine the SSID the beacon encodes, and transmits a message that informs FRE-CAM-Sync 50 that GT-TOF camera 32 has detected beacon 33 encoding the SSID and requests the access code associated with the SSID so that GT-TOF camera 32 can join the WLAN identified by the SSID. In FIG. 1B a double arrowhead dashed line 42 represents communication between GT-TOF camera 32 and FRE-CAM-Sync 50. After receiving the access code, GT-TOF camera 32 may transmit a "request message" to GT-TOF camera 31 encoding the ID of GT-TOF camera 32 requesting access to the WLAN and presenting the access code. A cascade of arcs 34 represents the message that GT-TOF camera 32 transmits to GT-TOF camera 31 requesting access to the WLAN.

Subsequent to receiving the ID and access code from GT-TOF camera 32, GT-TOF camera 31 may allow GT-TOF camera 32 access to the WLAN and transmits messages to GT-TOF camera 32 over the WLAN that instructs GT-TOF camera 32 to operate as a "slave" in a FDM imaging mode administered by GT-TOF camera 31 operating as a "master" of the WLAN. Operating as a master, GT-TOF camera 31 assigns different FDM imaging frequencies, f31 and f32, to itself and GT-TOF camera 32 respectively at which to transmit light pulses to illuminate lion 29 and respectively gate ON the cameras for exposure periods to register light reflected by the lion from the light pulses and acquire range images of the lion. In an embodiment, GT-TOF camera 31 assigns a pulse width PW31 to light pulses that it transmits at frequency f31 and a pulse width PW32 to light pulses transmitted by slave GT-TOF camera 32 at frequency f32. Optionally the pulse widths are different. In an embodiment, GT-TOF camera 31 assigns a duration for light pulse trains that GT-TOF camera 31 transmits and a duration for light pulse trains that GT-TOF camera 32 transmits. Optionally, the assigned durations of the light pulse trains are different. Master GT-TOF camera 31 acquires range images of the lion by transmitting light pulses having pulse widths PW31 at transmission frequency f31 and gating ON at frequency f31. Slave GT-TOF camera 32 acquires range images of the lion by transmitting light pulses having pulse widths PW32 at transmission frequency f32 and gating ON at frequency f32.

In an embodiment, f31 is greater than f32, and have corresponding periods T31=1/f31 and T32=1/f32. Optionally, the significands of the numerical values of T31 and T32 expressed in scientific notation are relatively prime numbers. PW31 is advantageously less than PW32. Determining different FDM frequencies for GT-TOF cameras 31 and 32, and/or having the significands of the periods relatively prime, and/or having the pulse width of the higher frequency pulses less than the pulse width of the lower frequency pulses moderates interference by light pulses transmitted by one of GT-TOF cameras 31 and 32 with the other of the cameras.

Figure 1C:
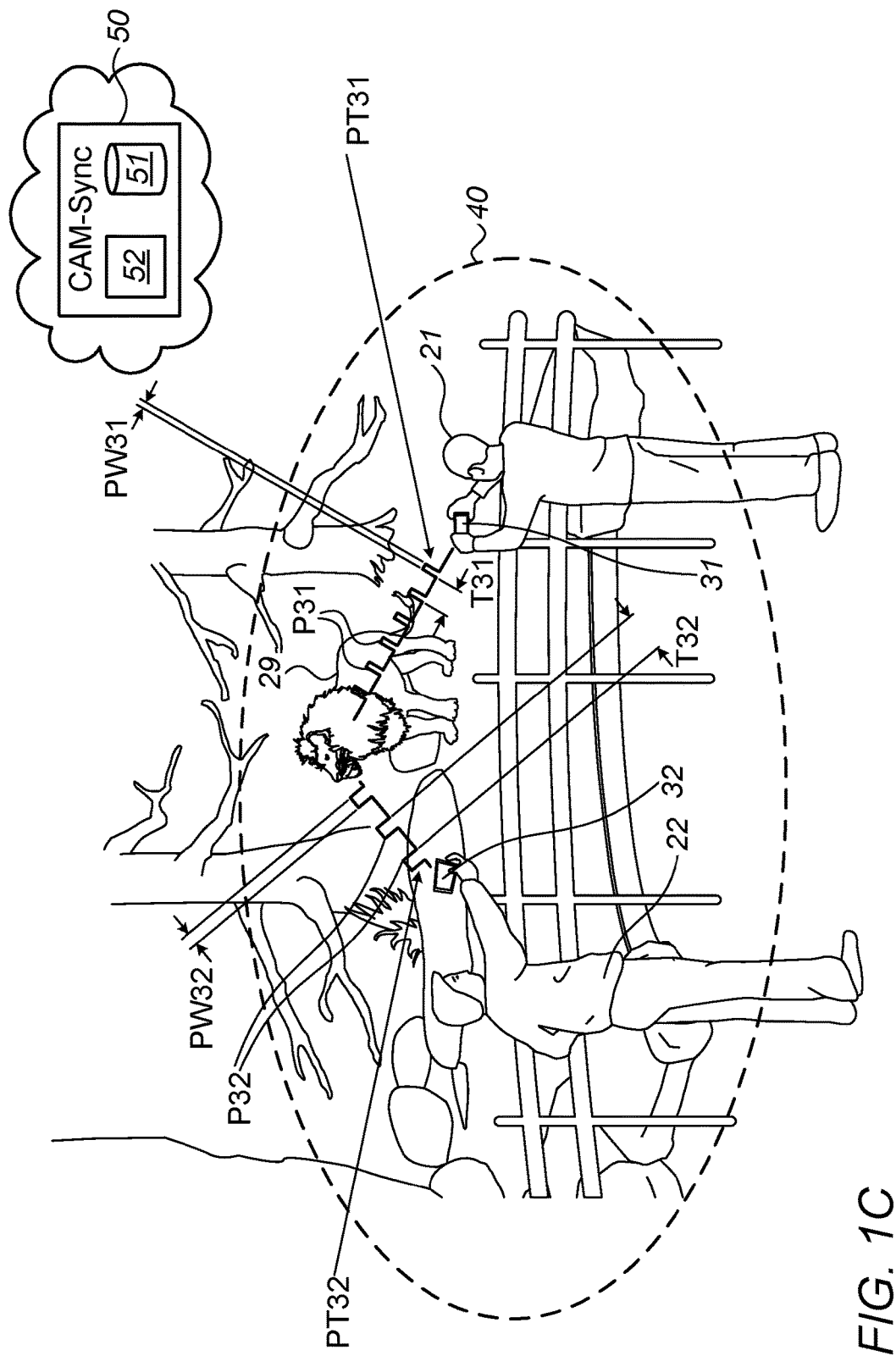
FIG. 1C schematically shows the two TOF range cameras shown in FIG. 1B simultaneously operating to range image a scene from the imaging neighborhood, in accordance with an embodiment of the disclosure.

FIG. 1C schematically shows GT-TOF cameras 31 and 32 respectively transmitting pulse trains PT31 and PT32 comprising light pulses P31 and P32. Light pulses P31 and P32 are transmitted at different transmission frequencies f31 and f32 and corresponding periods T31 and T32 respectively. In the figure, by way of example, f31 is greater than f32 and light pulses P31 have pulse widths PW31 that are smaller than the pulse widths PW32 of light pulses P32. The different frequencies and periods are graphically indicated by a difference in spacing between light pulses P31 in light pulse train LP31 and spacing between light pulses P32 in light pulse train LP32. Pulse widths PW31 and PW32 are schematically indicated by the widths of the pulses in pulse trains PT31 and PT32. By way of a numerical example, FDM imaging frequencies f31 and f32 may be chosen from frequencies in a range of frequencies between 10 MHz (megahertz) and 150 MHz. Light pulse widths may be selected from a range of pulse widths from about 1 ns (nanosecond) and 30 ns.

The FDM frequency, pulse width and light pulse train duration that a master GT-TOF camera allocates to slave GT-TOF camera in accordance with an embodiment of the disclosure, such as slave GT-TOF camera 32 shown in FIGS. 1B and 1C, may be customized to the slave GT-TOF camera's operating profile. The master GT-TOF camera may be informed of slave GT-TOF camera's operating profile by messages that the slave GT-TOF camera transmits, or by profile data that FRE-CAM-Sync 50 stores in database 51 for the slave GT-TOF camera and makes available to the master GT-TOF camera. For example, the FDM frequency, pulse width, pulse intensity and pulse train duration may depend upon optical and electrical parameters comprised in the slave GT-TOF camera specification, its operating temperature, power reserves, and distance from the slave GT-TOF camera of a scene to be range imaged by the slave camera. Distance of the scene may be determined from a range image of the scene that the GT-TOF camera acquires or by a conventional range finder comprised in the camera Additional subscriber GT-TOF cameras that enter imaging neighborhood 40 may communicate with FRE-CAM-Sync 50 and GT-TOF camera 31 similarly to the manner in which GT-TOF camera 32 communicated with FRE-CAM-Sync 50 and GT-TOF camera 31 to access and become a member of the WLAN, and operate as a slave in the FDM imaging mode administered by master GT-TOF camera 31. In an embodiment, each member GT-TOF camera of the WLAN established to support the FDM imaging mode for GT-TOF cameras located in imaging neighborhood 40 may periodically broadcast the SSID of the WLAN to alert non-member GT-TOF cameras to the existence of imaging neighborhood 40 and the neighborhood's FDM imaging mode that the WLAN supports. Alerted non-members may communicate with FRE-CAM-Sync 50 to acquire the access code needed for joining the WLAN and participating in the FDM imaging mode administered for imaging neighborhood 40. Having all members of the WLAN broadcasting the WLAN SSID enables non-member GT-TOF cameras that are too far from master GT-TOF camera 31 to effectively detect beacons that the master GT-TOF camera transmits, to join the WLAN, and enables imaging neighborhood 40 to grow as might be needed substantially independent of a range of beacons transmitted by any of the GT-TOF cameras that are members of the WLAN.

A slave GT-TOF camera may exit the FDM imaging mode by transmitting an "exit message" to master GT-TOF camera 31, or by not responding to an image-ON signal it receives from the master GT-TOF camera with, optionally, a receipt message. Master GT-TOF camera 31 may relinquish the role as master by transmitting a "master exit" message to a slave GT-TOF camera appointing the slave GT-TOF as a new master to administer the WLAN and FDM operation of remaining slave GT-TOF cameras active in neighborhood 40.

It is noted that the physical extent of imaging neighborhood 40 is not static and may grow or shrink as GT-TOF cameras subscribed to FRE-CAM-Sync 50 enter or leave the imaging neighborhood. A GT-TOF camera, such as GT-TOF camera 31 or 32 may enter an imaging neighborhood by physically entering the neighborhood while ON, or by being turned ON while in the neighborhood. A GT-TOF camera, may exit an imaging neighborhood by physically leaving the neighborhood while ON, or by being turned OFF.

In an embodiment of the disclosure FRE-CAM-Sync 50 may implement a FDM imaging mode for a plurality of subscriber GT-TOF cameras by directly allocating FDM imaging frequencies to the GT-TOF cameras. FIG. 2 schematically illustrates FRE-CAM-Sync 50 directly administering a FDM imaging mode for a plurality of, by way of example four, GT-TOF cameras 131, 132, . . . , 134 located in imaging neighborhood 40.

In an embodiment, each GT-TOF camera 131, . . . , 134 subscribed to FRE-CAM-Sync 50 is configured by a FRE-CAM-Sync app it comprises to communicate with FRE-CAM-Sync 50 when the GT-TOF camera is turned ON, and provide FRE-CAM-Sync 50 with the ID of the GT-TOF camera, and data that may be used to determine a geolocation of the GT-TOF camera. Communication between FRE-CAM-Sync 50 and a GT-TOF camera 131, . . . , 134 is indicated by a dashed line between the GT-TOF camera 131, . . . , 134 and FRE-CAM-Sync 50. FRE-CAM-Sync 50 may process the ID and geolocation data it receives to determine when two or more GT-TOF cameras subscribed to FRE-CAM-Sync 50, as schematically shown in FIG. 2 for GT-TOF cameras 131, . . . , 134, —become close enough to create an imaging neighborhood in which the cameras may interfere with each other's operation. When such a situation arises, FRE-CAM-Sync 50 transmits a FDM control signal to each GT-TOF camera in the imaging neighborhood—GT-TOF cameras 131, . . . , 134 in imaging neighborhood 40 shown in FIG. 2. The FDM control signal assigns the camera a unique FDM imaging frequency, and optionally at least one or any combination of more than one of a pulse width for light pulses that the camera transmits at the assigned FDM imaging frequency, intensity of the light pulses, and duration of a light pulse train comprising the transmitted light pulses. After receipt of the FDM control signal, the GT-TOF camera uses the data the control signal contains to configure operation of the camera in a FDM mode and images lion 29 with light reflected from light pulses transmitted at the FDM imaging frequency.

By way of example in FIG. 2 GT-TOF cameras 131, . . . , 134 are schematically shown illuminating lion 29 with light pulse trains PT131, PT132, PT133, and PT134 respectively to range image the lion. Each of the light pulse trains comprises light pulses transmitted at a different transmission frequency.

It is noted that whereas in the above description a TOF range camera is assumed to be a GT-TOF range camera, practice of an embodiment of the disclosure is not limited to GT-TOF cameras. For example, a TOF camera in accordance with an embodiment of the disclosure may be a "continuous wave" time of flight (CW-TOF) camera. A CW-TOF camera transmits an amplitude modulated "continuous wave" of electromagnetic radiation, optionally IR light, having intensity that is typically modulated by a harmonic modulating function to illuminate a scene that the camera images. Light reflected from the transmitted light by a feature in the scene reaches the camera as a wave of reflected light having a same modulation as the transmitted light, but shifted in phase by a phase shift, "$\varphi$" that is dependent on how far the feature is from the camera. The CW-TOF camera images the reflected light on a pixel or pixels of a photosensor and harmonically modulates sensitivity of the camera for registering light so that a pixel imaging the feature registers an amount of light that is a function of a cross-correlation of the exposure periods and the reflected light that is a function of phase shift $\varphi$. In an embodiment of the disclosure a FRE-CAM-Sync systems assigns a different FDM imaging frequency to each of a plurality of CW-TOF cameras located in a same imaging neighborhood. The CW-TOF cameras may harmonically modulate light they transmit at their respective FDM imaging frequencies to illuminate scenes they range image.

There is therefore provided in accordance with an embodiment of the disclosure a system for controlling operation of a plurality of active illumination time of flight (TOF) range cameras, the system comprising: a hub configured to communicate with mobile communication devices and comprising a database of active illumination TOF range cameras subscribed to the system; and a set of computer executable instructions comprised in each subscriber TOF range camera that configures the camera to communicate with the hub when located in a same imaging neighbourhood with other subscriber TOF range cameras to establish a frequency division multiplexing (FDM) imaging mode of operation in which each of the subscriber TOF range cameras is assigned a different FDM imaging frequency that the TOF range camera uses to determine a modulation period for light that the camera transmits to illuminate a scene that the camera images and a modulation period for modulating sensitivity of the TOF range camera to register light reflected by features in the scene from the transmitted modulated light.

Optionally, the subscriber TOF range cameras are configured to establish a wireless local area network (WLAN) over which the cameras in the imaging neighbourhood communicate to implement the FDM imaging mode. Optionally, each TOF range camera is configured to perform a radio scan after being turned on in the imaging neighbourhood to detect a radio beacon broadcast by another subscriber TOF range camera in the imagining neighbourhood, the radio beacon comprising a service set identifier (SSID) for the WLAN.

In an embodiment, if the TOF range camera does not detect the radio beacon, the TOF range camera is configured to communicate with the hub and request an SSID for establishing the WLAN, and an access code that another TOF range camera may present to be granted access to the WLAN. Optionally, the hub is configured to respond to the request and communicate an SSID and access code to the TOF range camera.

In an embodiment, based at least in part on receiving the SSID and access code the TOF range camera is configured to: broadcast a radio beacon comprising the SSID; assume a role as a master camera of the WLAN that accepts as members of the WLAN in the role of slave cameras, other subscriber TOF range cameras that detect the beacon and transmit a request comprising the access code to join the WLAN; and administer the FDM imaging mode of operation by allocating unique FDM imaging frequencies to slave cameras, which the slave cameras use to determine modulation periods for modulating light that the cameras transmit and modulating sensitivity of the slave cameras to register light.

Optionally, the master camera assigns each slave camera at least one or any combination of more than one of a light pulse width, light pulse intensity, and duration of a pulse train comprising light pulses the camera transmits. Optionally, the master camera is operable to receive an operating profile of the slave camera that is transmitted to the master camera over the WLAN, and based on the operating profile customize at least one or any combination of more than one of the FDM imaging frequency, light pulse width, light pulse intensity and pulse train duration. Optionally, the operating profile comprises at least one or any combination of more than one of: an optical parameter that characterizes the slave camera, an electrical parameter that characterizes the slave camera, an operating temperature of the slave camera, power reserves of the camera, and distance from the slave camera of a scene to be range imaged by the slave TOF camera.

In an embodiment, if the TOF range camera detects the radio beacon, the TOF range camera is configured to communicate with the hub to: request and receive the access code for the WLAN from the hub; after receiving the access code submit a request to the other subscriber camera acting as a master of the WLAN, to join the WLAN as a slave to the master; and after joining the WLAN receive a unique FDM imaging frequency at which to operate to acquire range images.

In an embodiment, each subscriber TOF range camera is configured to communicate with the hub when the subscriber camera is turned on, and transmit to the hub, data that may be used to determine a geolocation of the subscriber camera. Optionally, the hub is configured to process the geolocation data it receives from subscriber TOF range cameras to determine when two or more of the TOF range cameras are in a same imaging neighborhood in which the cameras may interfere with each other's operation. Optionally, subsequent to determining that two or more of the subscriber TOF range cameras are located in a same imaging neighbourhood, the hub is configured to communicate with the cameras to allocate FDM imaging frequencies to the subscriber TOF range cameras in the neighbourhood so that the subscriber TOF range cameras may operate in the FDM imaging mode.

In an embodiment, the active illumination TOF range cameras comprise gated TOF (GT-TOF) range cameras. Optionally, a GT-TOF camera of the plurality of GT-TOF cameras assigned a lower FDM imaging frequency transmits light pulses to illuminate a scene the camera images having a larger pulse width than light pulses that a GT-TOF camera of the plurality of GT-TOF cameras assigned a higher FDM imaging frequency transmits to illuminate a scene that the camera images.

In an embodiment, the active illumination TOF range camera comprises at a continuous wave time of flight (CW-TOF) range camera.

In an embodiment, the significands of the numerical values of the modulation periods expressed in scientific notation are relatively prime numbers.

In an embodiment, an active illumination TOF range camera of the plurality of TOF range cameras is comprised in a mobile communication device. Optionally, the mobile communication device is a laptop computer, a workbook, a tablet, a smartphone, a wrist watch, or glasses.

There is further provided in accordance with an embodiment of the disclosure, a method of imaging a scene using a plurality of active illumination TOF range cameras, the method comprising: establishing a wireless local area network (WLAN) over which the plurality of TOF range cameras communicate; and appointing one of the cameras to transmit messages to other of the cameras assigning them different FDM imaging frequencies at which to operate to acquire ranges images of scenes.

There is further provided in accordance with an embodiment of the disclosure, an active illumination time of flight (TOF) camera operable to determine distances to features in a scene, the TOF camera comprising: a light source configured to transmit temporally modulated light having a modulation period to illuminate the scene; a photosensor comprising at least one pixel configured to register amounts of light reflected from the transmitted modulated light by a feature in the scene that is imaged on a pixel of the at least one pixel; and a controller configured to: establish a frequency of operation for the TOF camera based on a presence of at least one other active illuminating camera in an imaging neighbourhood of the TOF camera whose operation may interfere with operation of the TOF camera; use the established frequency to determine a modulation period for the temporally modulated light that the TOF camera transmits, and modulate sensitivity of the at least one pixel to register light reflected by features in the scene from the transmitted modulated light; and determine a distance to the feature imaged on the pixel of the at least one pixel based on an amount of light that the pixel registers during modulation of the sensitivity of the at least one pixel. Optionally, the controller is configured to cooperate in establishing a wireless local area network (WLAN) over which to communicate with the at least one other active illumination camera. Optionally, the TOF camera is configured to establish the frequency of operation based on communications via the WLAN with the at least one other active illumination camera. Optionally, the controller is configured to establish the frequency of operation by requesting and receiving the frequency from a hub. Optionally, the TOF camera is a gated TOF (GT-TOF) camera or a continuous wave time of flight (CW-TOF) range camera.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of the various embodiments in the present application are provided by way of example and are not intended to limit the scope of the claimed subject matter. The described embodiments comprise different features, not all of which are required in all embodiments of the subject matter. Some embodiments utilize only some of the features or possible combinations of the features. Variations of embodiments that are described, and embodiments comprising different combinations of features noted in the described embodiments, will occur to users of the art. The scope of the embodiments is defined by the claims.

The invention claimed is:

1. A system for controlling operation of a plurality of active illumination time of flight (TOF) range cameras, the system comprising:
   a hub configured to communicate with mobile communication devices and comprising a database of active illumination TOF range cameras subscribed to the system; and
   a set of computer executable instructions comprised in each subscriber TOF range camera that configures the camera to communicate with the hub when located in a same imaging neighbourhood with other subscriber TOF range cameras to establish a frequency division multiplexing (FDM) imaging mode of operation in which each of the subscriber TOF range cameras is assigned a different FDM imaging frequency that the TOF range camera uses to determine a modulation period for light that the camera transmits to illuminate a scene that the camera images and a modulation period for modulating sensitivity of the TOF range camera to register light reflected by features in the scene from the transmitted modulated light.

2. The system according to claim 1 wherein the subscriber TOF range cameras are configured to establish a wireless local area network (WLAN) over which the cameras in the imaging neighbourhood communicate to implement the FDM imaging mode.

3. The system according to claim 2 wherein each TOF range camera is configured to perform a radio scan after being turned on in the imaging neighbourhood to detect a radio beacon broadcast by another subscriber TOF range camera in the imagining neighbourhood, the radio beacon comprising a service set identifier (SSID) for the WLAN.

4. The system according to claim 3 wherein if the TOF range camera does not detect the radio beacon, the TOF range camera is configured to communicate with the hub and request an SSID for establishing the WLAN, and an access code that another TOF range camera may present to be granted access to the WLAN.

5. The system according to claim 4 wherein the hub is configured to respond to the request and communicate an SSID and access code to the TOF range camera.

6. The system according to claim 5 wherein, based at least in part on receiving the SSID and access code, the TOF range camera is configured to:
   broadcast a radio beacon comprising the SSID;
   assume a role as a master camera of the WLAN that accepts as members of the WLAN in the role of slave cameras, other subscriber TOF range cameras that detect the beacon and transmit a request comprising the access code to join the WLAN; and
   administer the FDM imaging mode of operation by allocating unique FDM imaging frequencies to slave cameras, which the slave cameras use to determine modulation periods for modulating light that the cameras transmit and modulating sensitivity of the slave cameras to register light.

7. The system according to claim 6 wherein the master camera assigns each slave camera at least one or any combination of more than one of a light pulse width, light pulse intensity, and duration of a pulse train comprising light pulses the camera transmits.

8. The system according to claim 7 wherein the master camera is operable to receive an operating profile of the slave camera that is transmitted to the master camera over the WLAN, and based on the operating profile customize at least one or any combination of more than one of the FDM imaging frequency, light pulse width, light pulse intensity and pulse train duration.

9. The system according to claim 8 wherein the operating profile comprises at least one or any combination of more than one of: an optical parameter that characterizes the slave camera, an electrical parameter that characterizes the slave camera, an operating temperature of the slave camera, power reserves of the camera, and distance from the slave camera of a scene to be range imaged by the slave TOF camera.

10. The system according to claim 3 wherein if the TOF range camera detects the radio beacon, the TOF range camera is configured to communicate with the hub to: request and receive the access code for the WLAN from the hub; after receiving the access code submit a request to the other subscriber camera acting as a master of the WLAN, to join the WLAN as a slave to the master; and after joining the WLAN receive a unique FDM imaging frequency at which to operate to acquire range images.

11. The system according to claim 1 wherein each subscriber TOF range camera is configured to communicate with the hub when the subscriber TOF range camera is turned on, and transmit to the hub, data that may be used to determine a geolocation of the subscriber TOF range camera.

12. The system according to claim 11 wherein the hub is configured to process the geolocation data it receives from subscriber TOF range cameras to determine when two or more of the TOF range cameras are in a same imaging neighborhood in which the cameras may interfere with each other's operation.

13. The system according to claim 12 wherein subsequent to determining that two or more of the subscriber TOF range cameras are located in a same imaging neighbourhood, the hub is configured to communicate with the cameras to allocate FDM imaging frequencies to the subscriber TOF range cameras in the neighbourhood so that the subscriber TOF range cameras may operate in the FDM imaging mode.

14. The system according to claim 1 wherein the active illumination TOF range cameras comprise gated TOF (GT-TOF) range cameras and wherein a GT-TOF range camera of the plurality of GT-TOF cameras assigned a lower FDM imaging frequency transmits light pulses to illuminate a scene the camera images having a larger pulse width than light pulses that a GT-TOF range camera of the plurality of GT-TOF range cameras assigned a higher FDM imaging frequency transmits to illuminate a scene that the GT-TOF range camera images.

15. The system according to claim 1 wherein the plurality of active illumination TOF range cameras comprises at least one gated TOF range camera and/or at least one continuous wave time of flight (CW-TOF) range camera.

16. The system according to claim 1 wherein the significands of the numerical values of the modulation periods expressed in scientific notation are relatively prime numbers.

17. A method of imaging a scene using a plurality of active illumination TOF range cameras, the method comprising:
establishing a wireless local area network (WLAN) over which the plurality of TOF range cameras communicate; and
appointing one of the cameras to transmit messages to other of the TOF range cameras assigning them different FDM imaging frequencies of operation at which to operate to acquire ranges images of scenes, wherein the frequency of operation of each TOF range camera of the plurality of TOF range cameras is established based on receiving an assigned frequency of operation from at least one other TOF range camera in the imaging neighborhood or assigning different frequencies of operation to the other TOF range cameras in the imaging neighborhood.

18. An active illumination time of flight (TOF) range camera operable to determine distances to features in a scene, the TOF camera comprising: a light source configured to transmit temporally modulated light having a modulation period to illuminate the scene; a photosensor comprising at least one pixel configured to register amounts of light reflected from the transmitted modulated light by a feature in the scene that is imaged on a pixel of the at least one pixel; and a controller configured to: establish an FDM imaging frequency of operation for the TOF range camera based on a presence of at least one other active illuminating camera in an imaging neighbourhood of the TOF range camera whose operation may interfere with operation of the TOF range camera, wherein the FDM imaging frequency of operation is established based on receiving an assigned FDM imaging frequency of operation from at least one other active illuminating camera in the imaging neighborhood or assigning different frequencies of operation to the TOF range camera and the at least one other active illuminating camera in the imaging neighborhood; use the established FDM imaging frequency to determine a modulation period for the temporally modulated light that the TOF range camera transmits, and modulate sensitivity of the at least one pixel to register light reflected by features in the scene from the transmitted modulated light; and determine a distance to the feature imaged on the pixel of the at least one pixel based on an amount of light that the pixel registers during modulation of the sensitivity of the at least one pixel.

19. The active illumination TOF range camera according to claim 18 wherein the controller is configured to cooperate in establishing a wireless local area network (WLAN) over which to communicate with the at least one other active illumination TOF range camera and wherein the TOF range camera is configured to establish the frequency of operation based on communications via the WLAN with the at least one other active illumination TOF range camera.

20. The active illumination TOF range camera according to claim 18 wherein the controller is configured to establish the frequency of operation by requesting and receiving the frequency from a hub.

* * * * *